US012621778B2

(12) United States Patent
Takeda et al.

(10) Patent No.: US 12,621,778 B2
(45) Date of Patent: May 5, 2026

(54) POWER CONTROL FOR CARRIER AGGREGATION AND DUAL CONNECTIVITY OPERATION

(71) Applicant: QUALCOMM Incorporated, San Diego, CA (US)

(72) Inventors: Kazuki Takeda, Minato-ku (JP); Wanshi Chen, San Diego, CA (US); Peter Gaal, San Diego, CA (US); Juan Montojo, San Diego, CA (US); Gokul Sridharan, Sunnyvale, CA (US); Gene Fong, San Diego, CA (US); Timo Ville Vintola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/053,598

(22) Filed: Nov. 8, 2022

(65) Prior Publication Data

US 2024/0155516 A1      May 9, 2024

(51) Int. Cl.
*H04W 52/38*          (2009.01)

(52) U.S. Cl.
CPC ................................. *H04W 52/383* (2013.01)

(58) Field of Classification Search
CPC .. H04W 52/38; H04W 52/383; H04L 1/0026; H04L 1/0029
See application file for complete search history.

(56) References Cited

U.S. PATENT DOCUMENTS

| | | | | |
|---|---|---|---|---|
| 9,020,556 B2 * | 4/2015 | Haim | .................... | H04W 52/34 |
| | | | | 455/67.11 |
| 9,736,795 B2 * | 8/2017 | Dinan | ................. | H04W 52/367 |
| 9,974,028 B2 * | 5/2018 | Ouchi | ................... | H04L 5/0053 |
| 10,298,306 B2 * | 5/2019 | Shimezawa | ........... | H04W 72/23 |
| 10,763,936 B2 * | 9/2020 | Shimezawa | .......... | H04B 7/0626 |
| 10,959,193 B2 * | 3/2021 | Ouchi | ................... | H04W 72/21 |

(Continued)

FOREIGN PATENT DOCUMENTS

| | | | | |
|---|---|---|---|---|
| EP | 3573382 A1 * | 11/2019 | ............ | H04W 72/21 |
| WO | 2013067430 A1 | 5/2013 | | |

OTHER PUBLICATIONS

International Search Report and Written Opinion—PCT/US2023/078348—ISA/EPO—Feb. 27, 2024.

(Continued)

*Primary Examiner* — Hai V Nguyen

(74) *Attorney, Agent, or Firm* — QUALCOMM Incorporated

(57) ABSTRACT

Various aspects of the present disclosure generally relate to wireless communication. In some aspects, a user equipment (UE) may receive information associated with identifying a first transmit power for a first carrier in a band and a second transmit power for a second carrier in the band, wherein the first transmit power and the second transmit power exceed a per-carrier group power threshold. The UE may transmit at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold. Numerous other aspects are described.

22 Claims, 16 Drawing Sheets

(56) References Cited

U.S. PATENT DOCUMENTS

| | | | | |
|---|---|---|---|---|
| 11,381,365 | B2 * | 7/2022 | Liu | H04L 5/0053 |
| 11,818,669 | B2 * | 11/2023 | Wang | H04W 52/243 |
| 11,917,559 | B2 * | 2/2024 | Nadakuduti | H04B 7/0404 |
| 12,363,642 | B2 | 7/2025 | Takeda et al. | |
| 2012/0178494 | A1 * | 7/2012 | Haim | H04W 52/365 |
| | | | | 455/522 |
| 2013/0230121 | A1 * | 9/2013 | Molko | H04L 27/2623 |
| | | | | 375/295 |
| 2014/0126530 | A1 * | 5/2014 | Siomina | H04L 5/0073 |
| | | | | 370/330 |
| 2017/0041880 | A1 * | 2/2017 | Ouchi | H04L 5/0053 |
| 2017/0195028 | A1 * | 7/2017 | Shimezawa | H04B 7/0626 |
| 2017/0230917 | A1 * | 8/2017 | Ouchi | H04L 5/0055 |
| 2019/0207663 | A1 * | 7/2019 | Shimezawa | H04B 17/309 |
| 2020/0221311 | A1 | 7/2020 | Liu et al. | |
| 2020/0275388 | A1 * | 8/2020 | Frank | H04W 52/34 |
| 2020/0350969 | A1 * | 11/2020 | Shimezawa | H04B 7/0626 |
| 2021/0385814 | A1 * | 12/2021 | Abotabl | H04W 72/23 |
| 2021/0410084 | A1 * | 12/2021 | Li | H04W 52/265 |
| 2022/0030523 | A1 * | 1/2022 | Wang | H04W 52/243 |
| 2022/0132596 | A1 * | 4/2022 | Jeon | H04W 74/002 |
| 2022/0240326 | A1 * | 7/2022 | Rune | H04W 74/0866 |
| 2023/0180152 | A1 * | 6/2023 | Balevi | G06N 3/0464 |
| | | | | 455/518 |

OTHER PUBLICATIONS

3GPP: "3rd Generation Partnership Project, Technical Specification Group Radio Access Network, NR, Physical Layer Procedures for Control (Release 16)", 3GPP TS 38.213 V16.11.0, Sep. 2022, pp. 1-189, p. 33.

* cited by examiner

In case of power-limited, the sum power is scaled by K to be $P_{tot}$

774

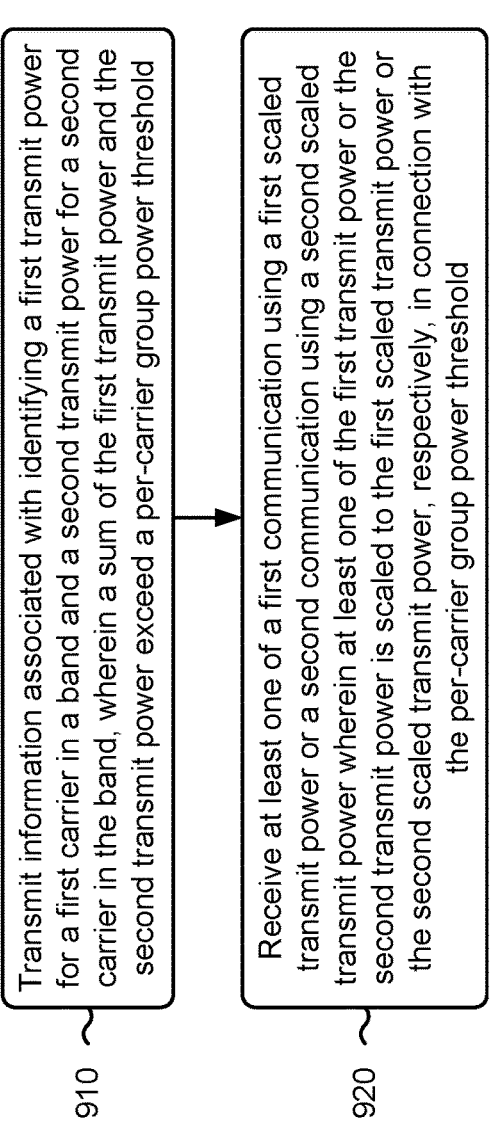

Transmit information associated with identifying a first transmit power for a first carrier in a band and a second transmit power for a second carrier in the band, wherein a sum of the first transmit power and the second transmit power exceed a per-carrier group power threshold

910

Receive at least one of a first communication using a first scaled transmit power or a second communication using a second scaled transmit power wherein at least one of the first transmit power or the second transmit power is scaled to the first scaled transmit power or the second scaled transmit power, respectively, in connection with the per-carrier group power threshold

POWER CONTROL FOR CARRIER AGGREGATION AND DUAL CONNECTIVITY OPERATION

FIELD OF THE DISCLOSURE

Aspects of the present disclosure generally relate to wireless communication and to techniques and apparatuses for power control for carrier aggregation and dual connectivity operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving information associated with identifying a first transmit power for a first carrier in a band and a second transmit power for a second carrier in the band, wherein the first transmit power and the second transmit power exceed a per-carrier group power threshold. The method may include transmitting at least one of a first communication using a first scaled transmit power or a second communication using a second scaled transmit power, where at least one of the first transmit power or the second transmit power is scaled to form the first scaled transmit power or the second scaled transmit power in connection with the per-carrier group power threshold.

Some aspects described herein relate to a method of wireless communication performed by a network node. The method may include transmitting information associated with identifying a first transmit power for a first carrier in a band and a second transmit power for a second carrier in the band, wherein a sum of the first transmit power and the second transmit power exceed a per-carrier group power threshold. The method may include receiving at least one of a first communication using a first scaled transmit power or a second communication using a second scaled transmit power, where at least one of the first transmit power or the second transmit power is scaled to the first scaled transmit power or the second scaled transmit power, respectively, in connection with the per-carrier group power threshold.

Some aspects described herein relate to a UE for wireless communication. The UE may include a memory and one or more processors coupled to the memory. The one or more processors may be configured to receive information associated with identifying a first transmit power for a first carrier in a band and a second transmit power for a second carrier in the band, wherein the first transmit power and the second transmit power exceed a per-carrier group power threshold. The one or more processors may be configured to transmit at least one of a first communication using a first scaled transmit power or a second communication using a second scaled transmit power, where at least one of the first transmit power or the second transmit power is scaled to form the first scaled transmit power or the second scaled transmit power in connection with the per-carrier group power threshold.

Some aspects described herein relate to a network node for wireless communication. The network node may include a memory and one or more processors coupled to the memory. The one or more processors may be configured to transmit information associated with identifying a first transmit power for a first carrier in a band and a second transmit power for a second carrier in the band, wherein a sum of the first transmit power and the second transmit power exceed a per-carrier group power threshold. The one or more processors may be configured to receive at least one of a first communication using a first scaled transmit power or a second communication using a second scaled transmit power, where at least one of the first transmit power or the second transmit power is scaled to the first scaled transmit power or the second scaled transmit power, respectively, in connection with the per-carrier group power threshold.

Some aspects described herein relate to a non-transitory computer-readable medium that stores a set of instructions for wireless communication by a UE. The set of instructions, when executed by one or more processors of the UE, may cause the UE to receive information associated with identifying a first transmit power for a first carrier in a band and a second transmit power for a second carrier in the band, wherein the first transmit power and the second transmit power exceed a per-carrier group power threshold. The set of instructions, when executed by one or more processors of the UE, may cause the UE to transmit at least one of a first communication using a first scaled transmit power or a second communication using a second scaled transmit power, where at least one of the first transmit power or the second transmit power is scaled to form the first scaled transmit power or the second scaled transmit power in connection with the per-carrier group power threshold.

Some aspects described herein relate to a non-transitory computer-readable medium that stores a set of instructions for wireless communication by a network node. The set of instructions, when executed by one or more processors of the network node, may cause the network node to transmit information associated with identifying a first transmit power for a first carrier in a band and a second transmit power for a second carrier in the band, wherein a sum of the first transmit power and the second transmit power exceed a per-carrier group power threshold. The set of instructions, when executed by one or more processors of the network node, may cause the network node to receive at least one of a first communication using a first scaled transmit power or a second communication using a second scaled transmit power, where at least one of the first transmit power or the second transmit power is scaled to the first scaled transmit power or the second scaled transmit power, respectively, in connection with the per-carrier group power threshold.

Some aspects described herein relate to an apparatus for wireless communication. The apparatus may include means for receiving information associated with identifying a first transmit power for a first carrier in a band and a second transmit power for a second carrier in the band, wherein the first transmit power and the second transmit power exceed a per-carrier group power threshold. The apparatus may include means for transmitting at least one of a first communication using a first scaled transmit power or a second communication using a second scaled transmit power, where at least one of the first transmit power or the second transmit power is scaled to form the first scaled transmit power or the second scaled transmit power in connection with the per-carrier group power threshold.

Some aspects described herein relate to an apparatus for wireless communication. The apparatus may include means for transmitting information associated with identifying a first transmit power for a first carrier in a band and a second transmit power for a second carrier in the band, wherein a sum of the first transmit power and the second transmit power exceed a per-carrier group power threshold. The apparatus may include means for receiving at least one of a first communication using a first scaled transmit power or a second communication using a second scaled transmit power, where at least one of the first transmit power or the second transmit power is scaled to the first scaled transmit power or the second scaled transmit power, respectively, in connection with the per-carrier group power threshold.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
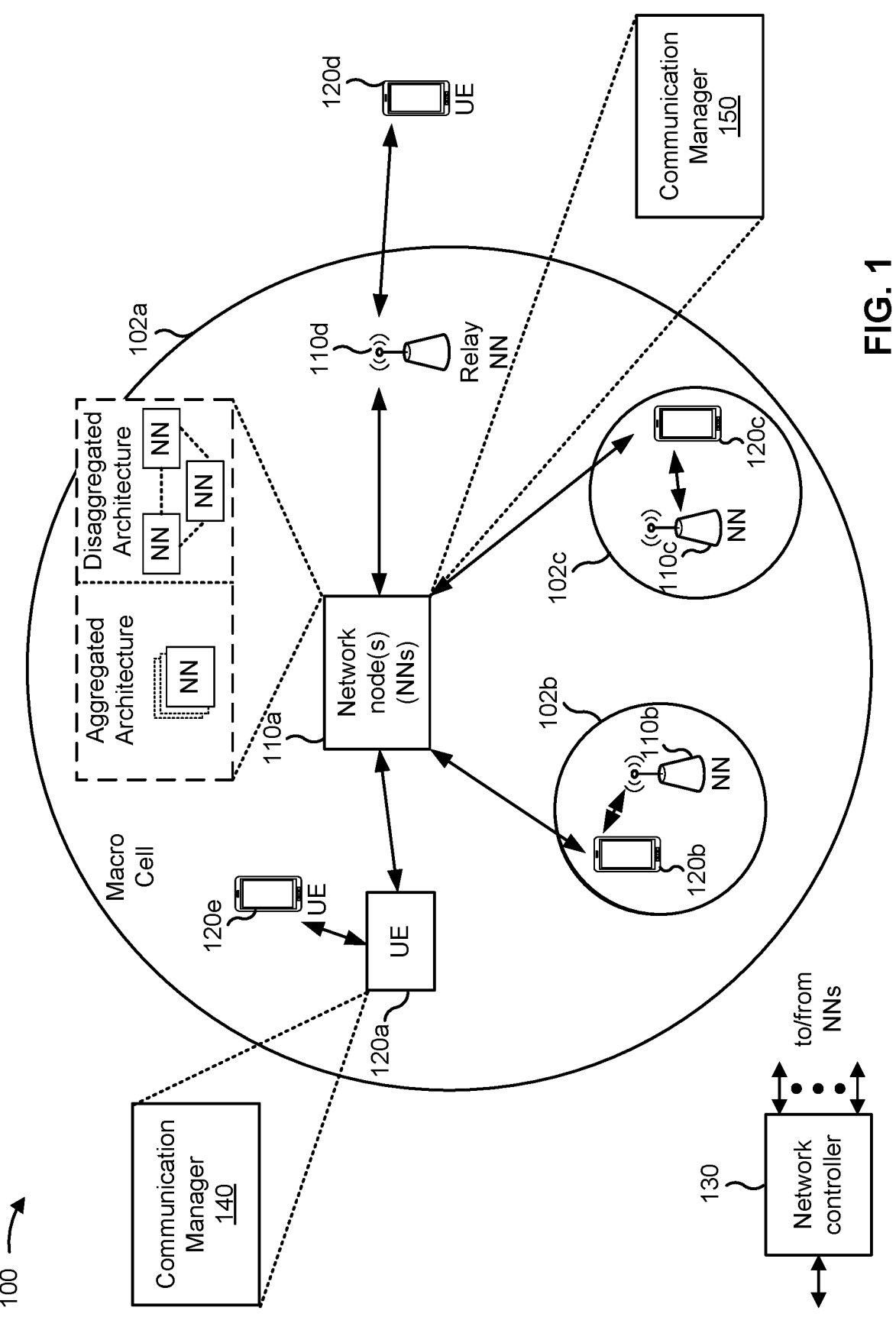
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB)

node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information associated with identifying a first transmit power for a first carrier in a band and a second transmit power for a second carrier in the band, wherein the first transmit power and the second transmit power exceed a per-carrier group power threshold; and transmit at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold. Additionally, or alternatively, the communication manager 140 may perform one or more other operations described herein.

In some aspects, the network node 110 may include a communication manager 150. As described in more detail elsewhere herein, the communication manager 150 may transmit information associated with identifying a first transmit power for a first carrier in a band and a second transmit power for a second carrier in the band, wherein a sum of the first transmit power and the second transmit power exceed a per-carrier group power threshold; and receive at least one of a first communication using a first scaled transmit power or a second communication using a second scaled transmit power, wherein at least one of the first transmit power or the second transmit power is scaled to the first scaled transmit power or the second scaled transmit power, respectively, in connection with the per-carrier group power threshold.

Additionally, or alternatively, the communication manager 150 may perform one or more other operations described herein.

As indicated above, FIG. 1 is provided as an example. Other examples may differ from what is described with regard to FIG. 1.

Figure 2:
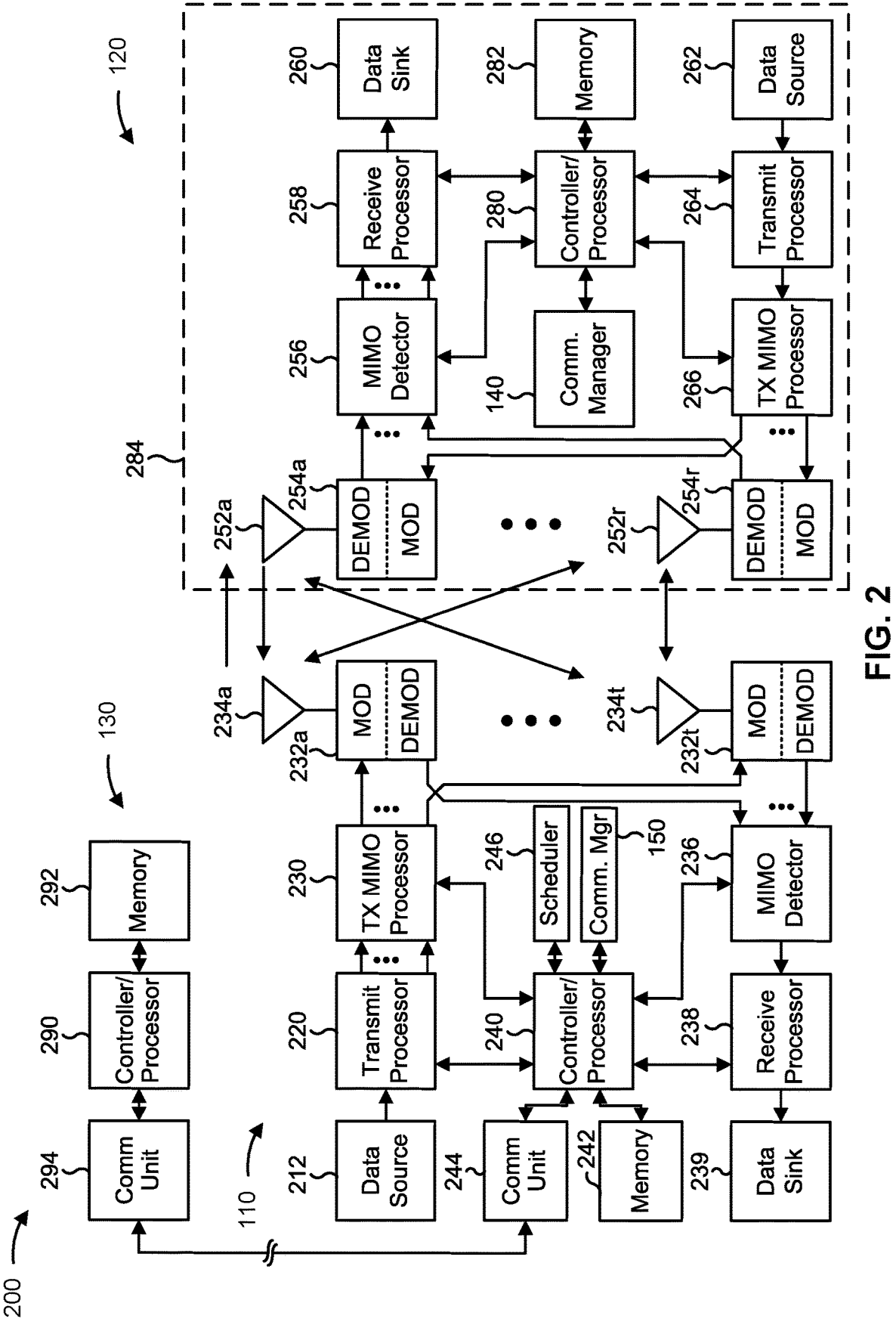
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T>1). The UE 120 may be equipped with a set of antennas 252a through 252r, such as R antennas (R>1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-11).

The controller/processor 240 of the network node 110, the controller/processor 280 of the UE 120, and/or any other component(s) of FIG. 2 may perform one or more techniques associated with power control for carrier aggregation and dual connectivity operation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving information associated with identifying a first transmit power for a first carrier in a band and a second transmit power for a second carrier in the band, wherein the first transmit power and the second transmit power exceed a per-carrier group power threshold; and/or means for transmitting at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting information associated with identifying a first transmit power for a first carrier in a band and a second transmit power for a second carrier in the band, wherein a sum of the first transmit power and the second transmit power exceed a per-carrier group power threshold; and/or means for receiving at least one of a first communication using a first scaled transmit power or a second communication using a second scaled transmit power, wherein at least one of the first transmit power or the second transmit power is scaled to the first scaled transmit power or the second scaled transmit power, respectively, in connection with the per-carrier group power threshold. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
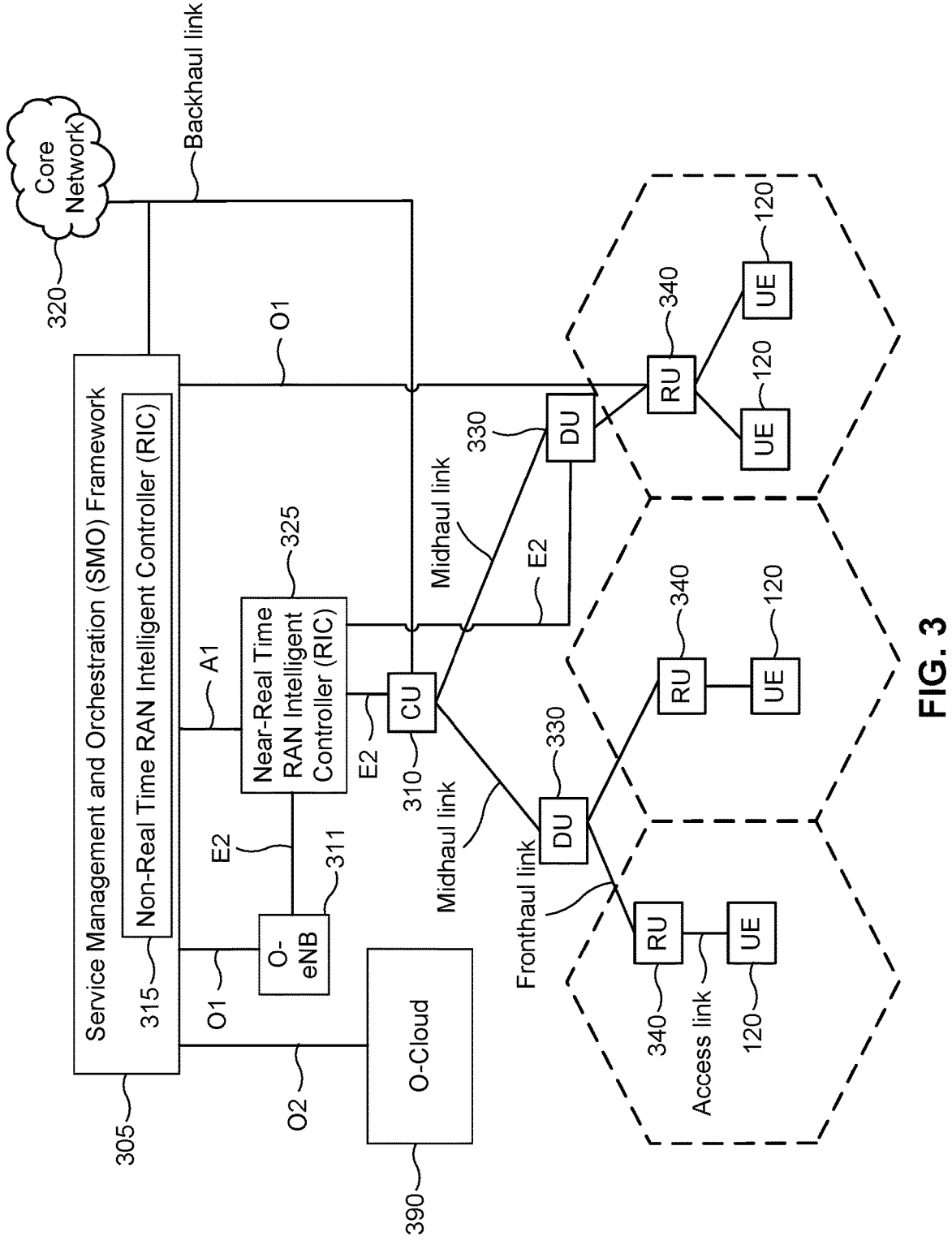
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC)

layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
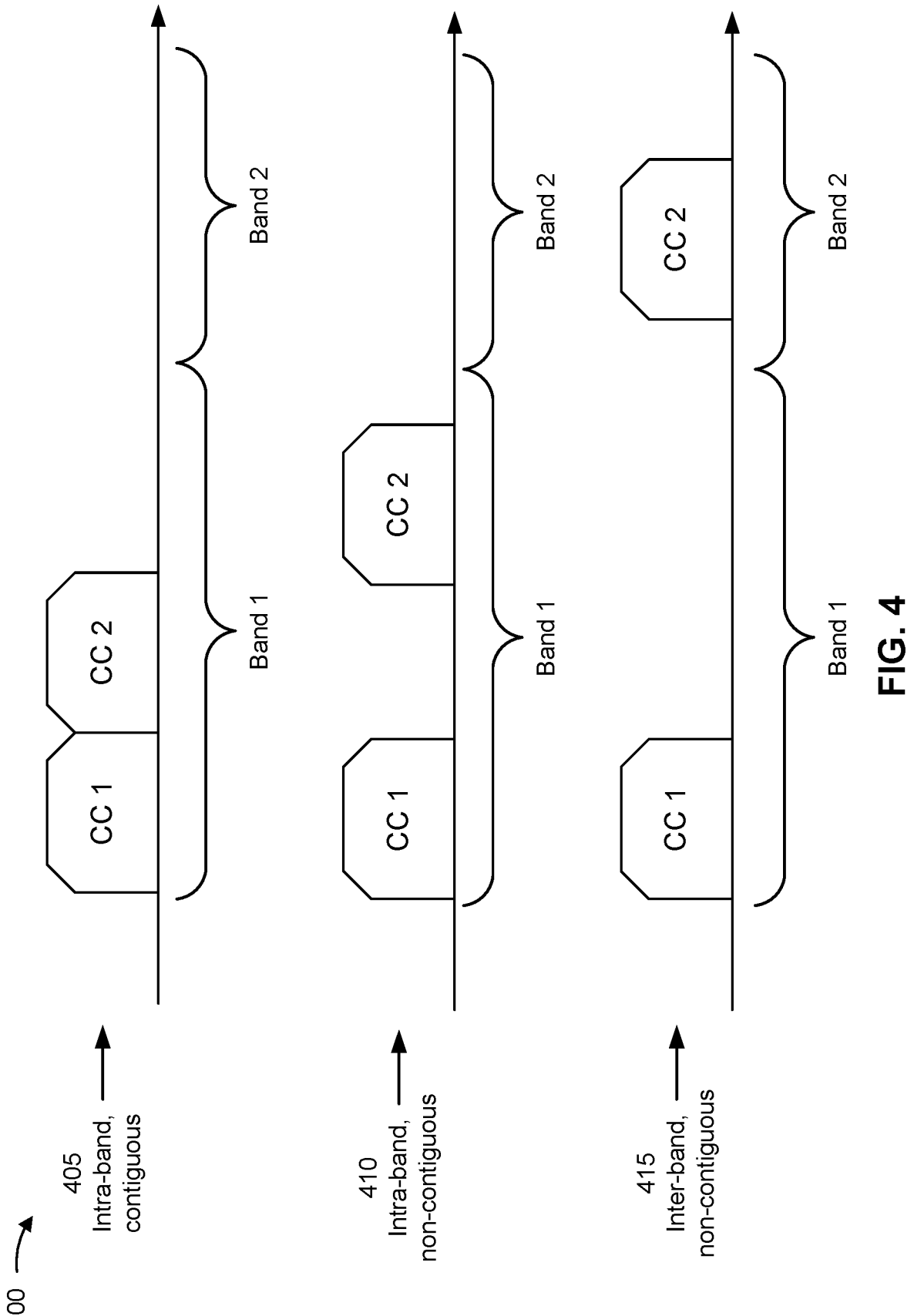
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, downlink control information (DCI), and/or another signaling message.

As shown by reference number 405, in some examples, carrier aggregation may be configured in an intra-band contiguous mode where the aggregated carriers are contiguous to one another and are in the same band. As shown by reference number 410, in some examples, carrier aggregation may be configured in an intra-band non-contiguous mode where the aggregated carriers are non-contiguous to one another and are in the same band. As shown by reference number 415, in some examples, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some examples, the primary carrier may carry control information (e.g., downlink control information and/or scheduling information) for scheduling data communications on one or more secondary carriers, which may be referred to as cross-carrier scheduling. In some examples, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
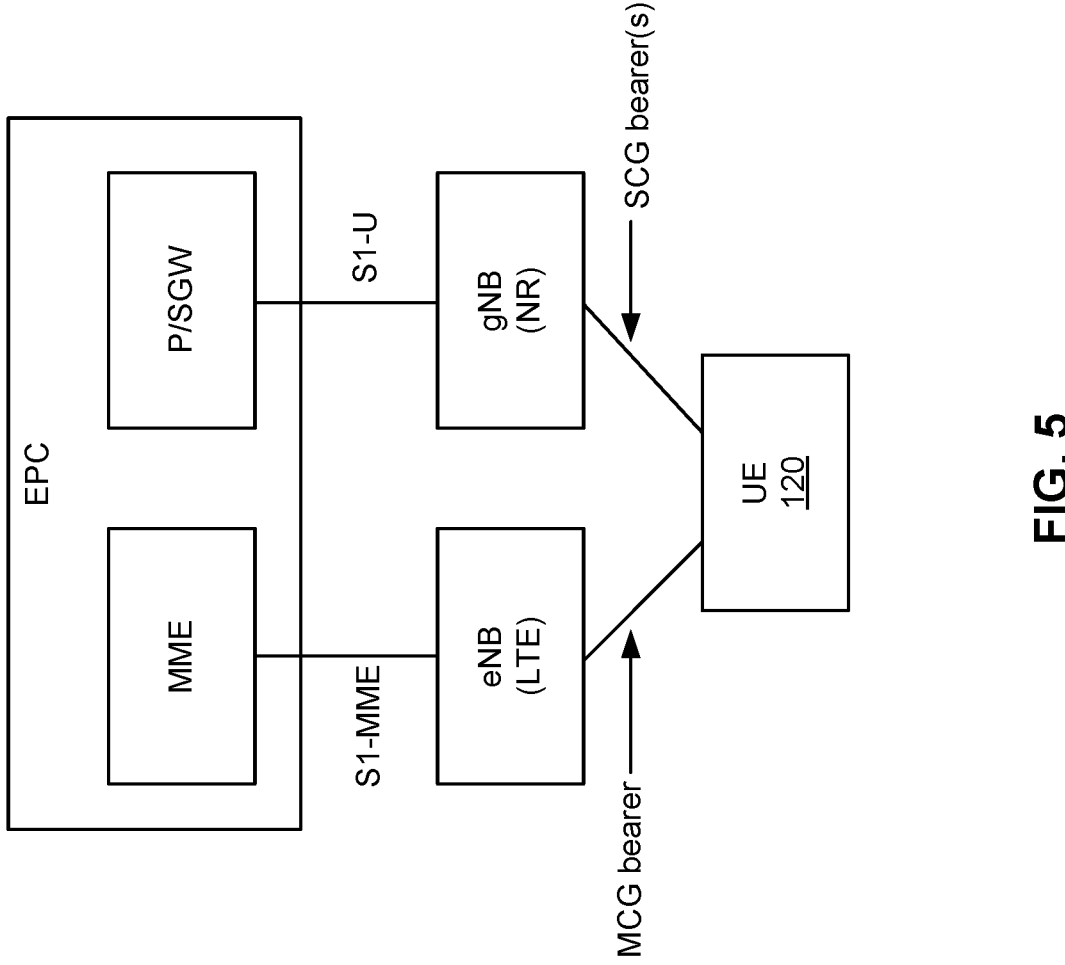
FIG. 5 is a diagram illustrating an example of dual connectivity, in accordance with the present disclosure.

FIG. 5 is a diagram illustrating an example 500 of dual connectivity, in accordance with the present disclosure. The example shown in FIG. 5 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). Some example deployments for dual connectivity may include an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 5, a UE 120 may communicate with both an eNB (e.g., a 4G network node 110) and a gNB (e.g., a 5G network node 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 5, the PGW and the SGW are shown collectively as P/SGW. In some examples, the eNB and the gNB may be co-located at the same network node 110. In some examples, the eNB and the gNB may be included in different network nodes 110 (e.g., may not be co-located).

As further shown in FIG. 5, in some examples, a wireless network that permits operation in a 5G NSA mode may permit such operations using a master cell group (MCG) for a first RAT (e.g., an LTE RAT or a 4G RAT) and a secondary cell group (SCG) for a second RAT (e.g., an NR RAT or a 5G RAT). In this case, the UE 120 may communicate with the eNB via the MCG, and may communicate with the gNB via the SCG. In some examples, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some examples, the gNB and the eNB may not transfer user plane information between one another. In some examples, a UE 120 operating in a dual connectivity mode may be concurrently connected with an LTE network node 110 (e.g., an eNB) and an NR network node 110 (e.g., a gNB) (e.g., in the case of ENDC or NEDC), or may be concurrently connected with one or more network nodes 110 that use the same RAT (e.g., in the case of NRDC). In some examples, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some examples, a radio bearer may be dedicated to a specific cell group (e.g., a radio bearer may be an MCG bearer or an SCG bearer). In some examples, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some examples, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 5 is provided as an example. Other examples may differ from what is described with respect to FIG. 5.

Figure 6:
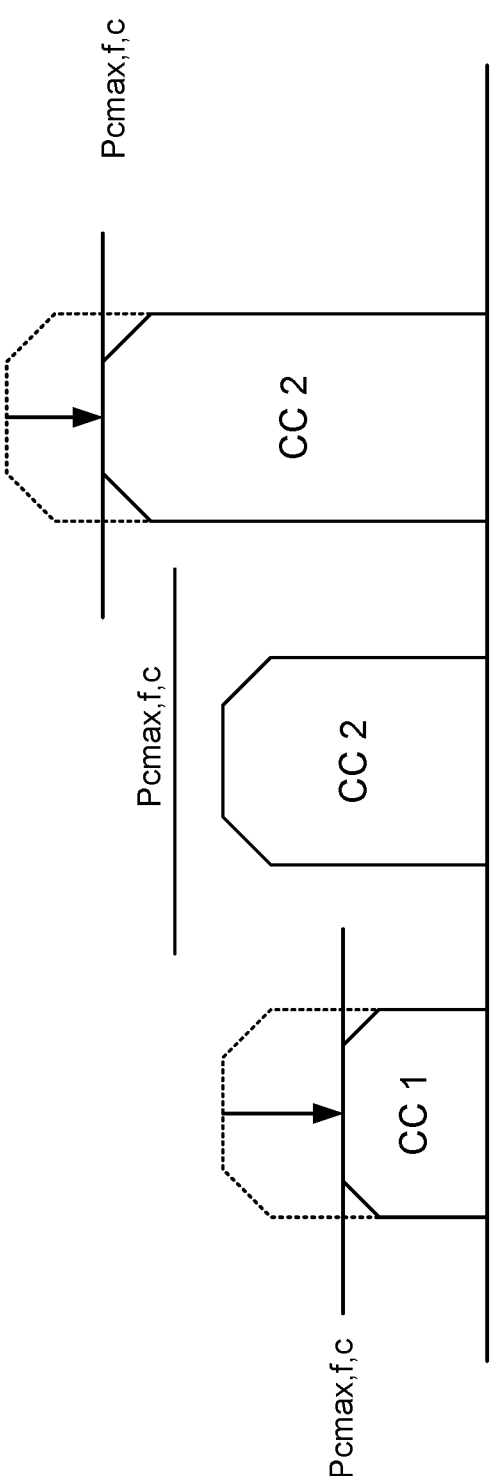
FIG. 6 is a diagram illustrating an example of power control, in accordance with the present disclosure.

FIG. 6 is a diagram illustrating an example 600 of power control, in accordance with the present disclosure.

As shown in FIG. 6, in carrier aggregation or dual-connectivity, a UE may be configured for communication on a set of carriers CC1, CC2, and CC3. Each carrier may have a separate maximum transmit power $P_{CMAX,f,c}$. For each carrier, the UE determines a transmit power such that the transmit power on that carrier does not exceed the maximum transmit power. In other words, as shown, the UE may calculate transmit powers that exceed $P_{CMAX,f,c}$ on CC1 and CC3 and, accordingly, reduce the calculated transmit power such that the reduced transmit power does not exceed $P_{CMAX,f,c}$. On CC2, the UE calculates a transmit power that does not exceed $P_{CMAX,f,c}$ and, accordingly, does not reduce the calculated transmit power on CC2. After ensuring that each carrier does not exceed a respective maximum transmit power (e.g., which may or may not differ on each carrier), the UE determines whether a total transmit power across the carriers (e.g., for concurrently occurring transmissions) exceeds a total maximum transmit power $P_{CMAX}$. If $P_{CMAX}$ is exceeded across all of the carriers (or a subset of the carriers, such as all carriers on FR1 or all carriers on FR2), the UE may perform power scaling to ensure that the total maximum transmit power is not exceeded by transmissions on multiple carriers. In some examples, the UE may perform power scaling on a priority basis. For example, when a total transmit power across all carriers in a frequency band, such as FR1 or FR2, exceeds a total maximum power $P_{CMAX}$, the UE may allocate available transmit power to uplink transmissions according to a priority order so that the total power does not exceed $P_{CMAX}$.

As indicated above, FIG. 6 is provided as an example. Other examples may differ from what is described with respect to FIG. 6.

For inter-band and intra-band uplink carrier aggregation or dual-connectivity, the UE ensures that a transmit power of each carrier does not exceed a per-carrier limit (e.g., a power class of a carrier, $P_{CMAX,f,c}$) and that a total transmit power of all carriers across a plurality of bands does not exceed a per-carrier aggregation limit (e.g., a power class of the carrier aggregation). However, the UE may not be configured to adjust transmit powers such that a total transmit power of carriers in a single band does not exceed a per-band limit (e.g., a power class of the band). In other words, when a first band includes a first set of carriers and a second band includes a second set of carriers, a total transmit power of the first set of carriers and the second set of carriers may not exceed a cross-band maximum, but a total transmit power of, for example, only the first set of carriers may exceed a single-band maximum. Additionally, in some scenarios, a cross-band maximum can be exceeded without causing a negative impact to communications.

Some aspects described herein enable power control for carrier aggregation and dual-connectivity. For example, a UE may be configured with a power handling procedure for intra-band and inter-band power control (e.g., to avoid exceeding intra-band maximum transmit power thresholds and/or inter-band maximum transmit power thresholds). In this case, the UE may apply scaling to calculated transmit powers to determine scaled transmit powers that, for example, collectively, do not exceed a power maximum, such as an intra-band power maximum. In this way, the UE can optimize available transmit power while complying with transmit power maximums established to avoid negative impacts to communication, such as to avoid interference.

Figure 7A:
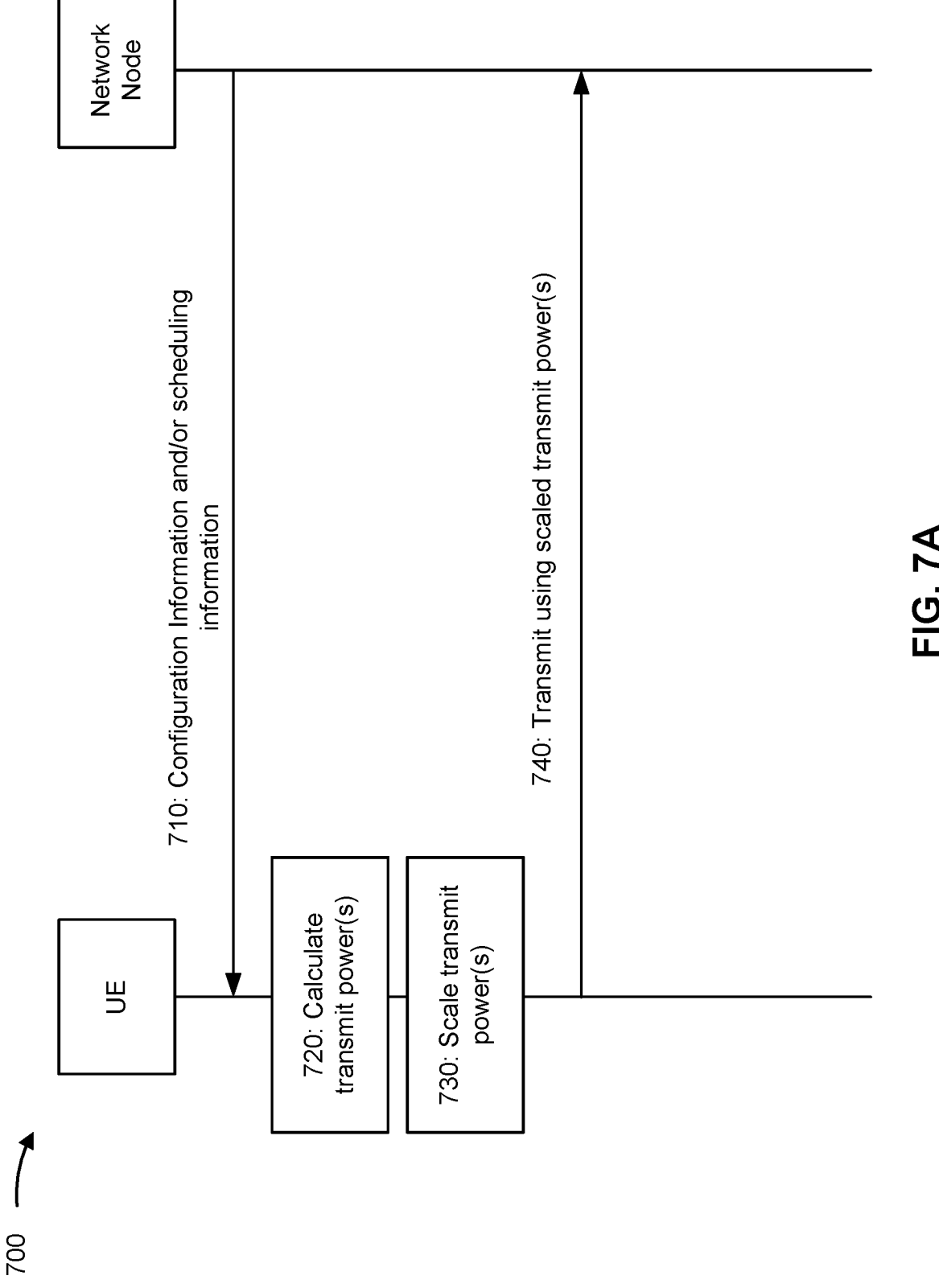
FIGS. 7A-7F are diagrams illustrating an example associated with power control for carrier aggregation and dual connectivity operation, in accordance with the present disclosure.

FIGS. 7A-7F are diagrams illustrating an example 700 associated with power control for carrier aggregation and dual connectivity operation, in accordance with the present disclosure. As shown in FIG. 7A, example 700 includes communication between a network node 110 and a UE 120.

As further shown in FIG. 7A, and by reference number 710, UE 120 may receive configuration information and/or scheduling information. For example, the UE 120 may receive configuration information identifying one or more transmit power thresholds, as described herein. Additionally, or alternatively, the UE 120 may receive information associated with scheduling a set of transmissions, such as information identifying a set of carriers, information identifying a set of resources on the set of carriers, information triggering transmission on the set of resources, or information identifying a transmit power for a transmission, among other examples.

As further shown in FIG. 7A, and by reference numbers 720 and 730, the UE 120 may calculate one or more transmit powers and may scale the one or more transmit powers (or a subset thereof). For example, the UE 120 may calculate a first transmit power for transmission of a first communication on first carrier in a band and a second transmit power for a transmission of a second communication on a second carrier in the band. In this case, a sum of the first transmit power and the second transmit power may exceed a transmit power threshold for the band, which may trigger the UE 120 to scale the first transmit power, the second transmit power, or both the first transmit power and the second transmit power to avoid exceeding the transmit power threshold.

Figure 7B:
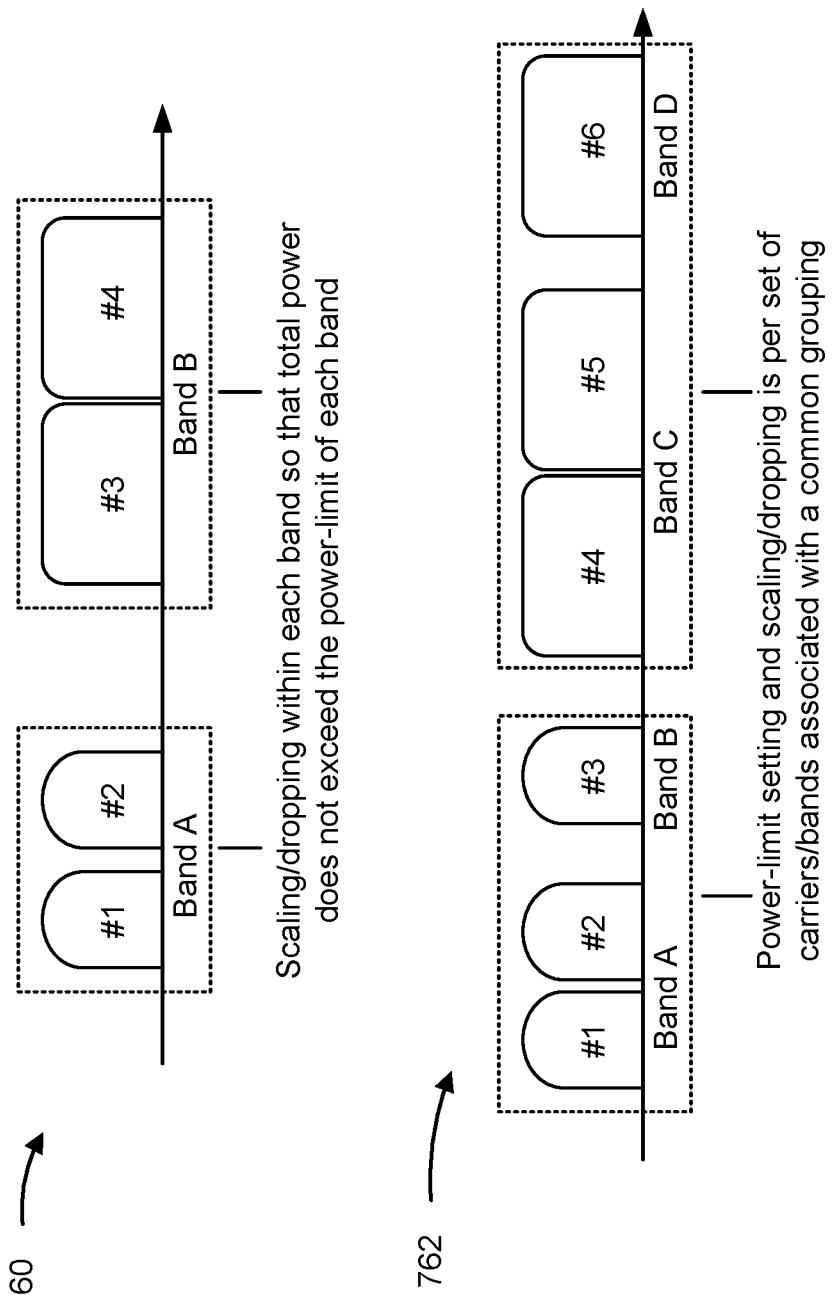

In some aspects, the UE 120 may determine whether a total power of uplink carriers in a frequency band exceeds a total power limit for the frequency band. For example, as shown in FIG. 7B, and by reference number 760, the UE 120 may determine whether a total power of carriers 1 and 2 on band A exceeds a total power for band A and/or whether a total power of carriers 3 and 4 on band B exceeds a total power for band B. In this case, the UE 120 may scale or drop a transmit power of one or more uplink carriers on a frequency band for which a total power is exceeded. For example, when the total power of carriers 1 and 2 on band A exceeds a maximum power for band A, the UE 120 may scale or drop a first transmit power of carrier 1 and/or a second transmit power of carrier 2. Similarly (and independently), the UE 120 may scale or drop a third transmit power of carrier 3 and/or a fourth transmit power of carrier 4 when the total power of carriers 3 and 4 on band B exceeds a maximum power for band B. In other words, the UE 120 may evaluate and scale band A and band B separately based on respective maximum powers (e.g., rather than scaling a transmission on band A based at least in part on a power of a carrier on band B).

In some aspects, rather than evaluate power on a per-band basis, the UE 120 may evaluate power on another basis. For example, the UE 120 may group carriers and/or transmissions for power evaluation on a per band group basis (e.g., a configured band group of carriers that may or may not correspond to a single band), a per power amplifier basis (e.g., a configured group of carriers for transmission using a single amplifier), a per transmit chain basis (e.g., a configured group of carriers for processing using a single transmit chain), or another basis. As shown in FIG. 7B, and by reference number 762, a first grouping includes carriers 1 and 2 of band A and carrier 3 of band B and a second grouping includes carriers 4 and 5 of band C and carrier 6 of band D. The UE 120 may determine whether a total transmit power of, for example, carriers 1-3 exceeds a total transmit power for the first grouping and scale one or more of carriers 1-3 accordingly. Similarly (and independently), the UE 120 may determine whether carriers 4-6 exceed a total transmit power for the second grouping and scale one or more of carriers 4-6 accordingly. In this case, the network node 110 may indicate which carriers to group into a single group, to amplify using a single amplifier, or to process using a single transmit chain. Additionally, or alternatively, the UE 120 may indicate to the network node 110 information identifying which carriers are associated with a single group, amplifier, or transmit chain.

Figure 7C:
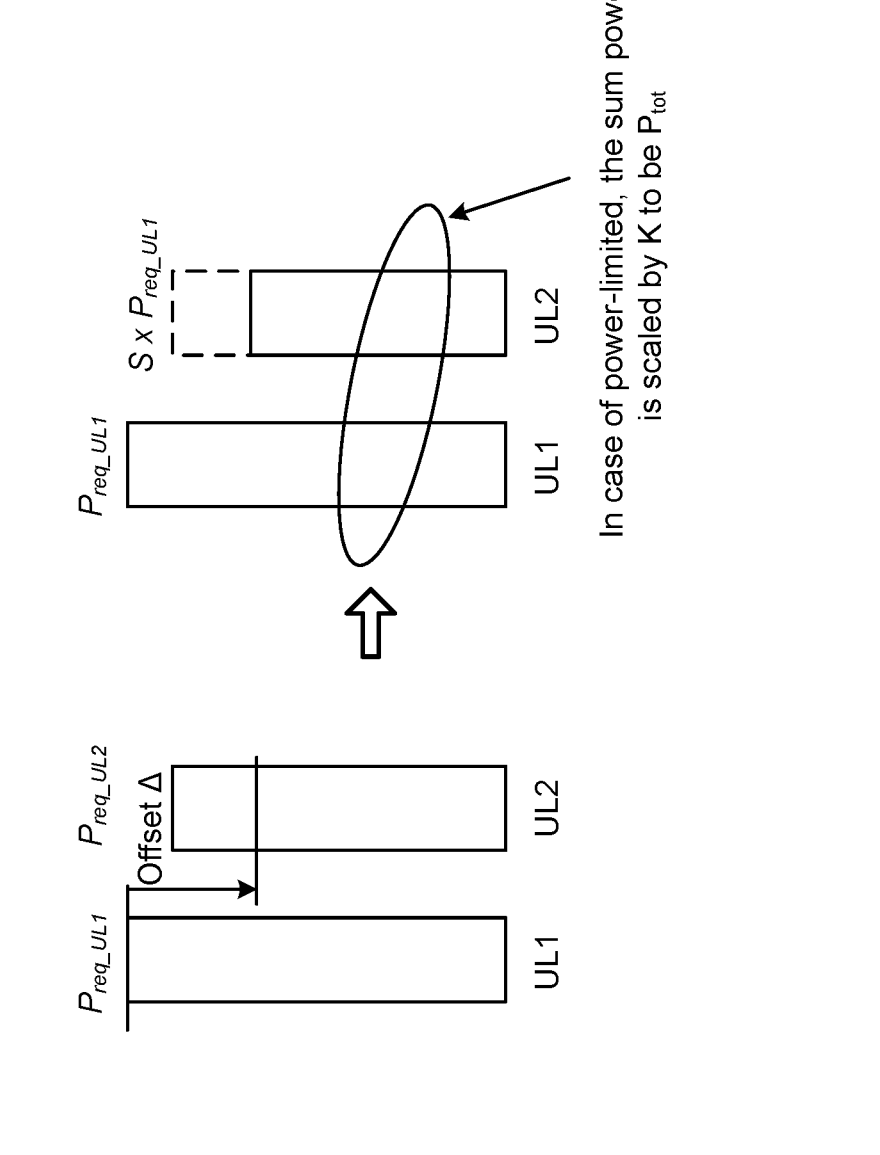

In some aspects, the UE 120 may scale a transmit power in a single band or grouping using a power scaling procedure. For example, the UE 120 may use a priority-based power scaling procedure in which the UE 120 allocates power to different carriers based on relative priorities of transmissions being conveyed thereon, as described in more detail in 3GPP Technical Specification (TS) 38.213 with regard to per frequency band power scaling. Additionally, or alternatively, the UE 120 may use a different prioritization for allocating transmit power, such as a prioritization that includes prioritizing primary cell (PCell), primary secondary cell (PSCell), or physical uplink control channel (PUCCH) secondary cell (SCell) (PUCCH-SCell) transmissions over other transmissions within the same band or grouping. Additionally, or alternatively, the UE 120 may allocate transmit power based at least in part on a received configuration. For example, the UE 120 may receive, via radio resource control (RRC) signaling, information identifying an offset value between two carriers. In this case, the UE 120 may scale transmit powers such that the offset value between the carriers is maintained for respective scaled transmit powers, as shown in FIG. 7C and by reference number 764.

Figure 7D:
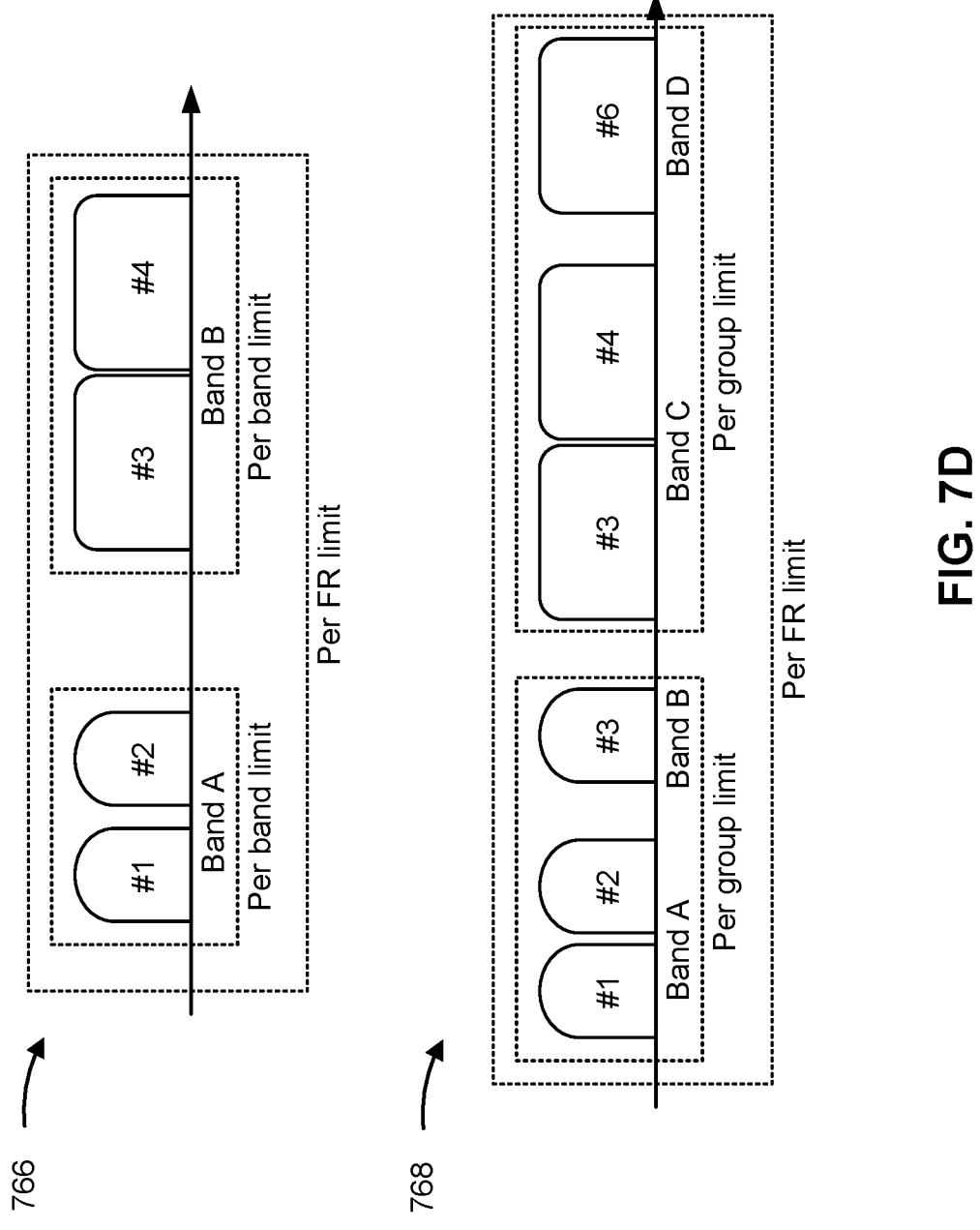

In some aspects, the UE 120 may determine whether a plurality of different types of power limits are exceeded. For example, as shown in FIG. 7D, and by reference numbers 766 and 768, the UE 120 may be configured with a per band power limit and a per frequency band (e.g., FR1 or FR2) power limit or may be configured with a per group power limit and a per frequency band power limit. In this case, the UE 120 may determine scaled transmit powers based at least in part on the plurality of different types of power limits. For example, the UE 120 may perform power scaling within a band according to a per-band limit and then perform power scaling between bands according to a per frequency band limit. In this case, the UE 120 determines a transmit power of each uplink carrier and scales each uplink carrier such that each uplink carrier does not exceed a maximum power $P_{CMAX,f,c}$; determines whether a total transmit power of uplink carriers in a group or band exceeds a maximum transmit power for the group or band and, if so, scales uplink carriers in the group or band; and determines whether a total power of uplink carriers across groups or bands in a frequency band (e.g., FR1 or FR2) exceeds a maximum transmit power for the frequency band and, if so, scales uplink carriers in the frequency band. In some aspects, the UE 120 may determine priorities of bands or groupings and scale transmit powers for the bands or groupings or carriers thereof based at least in part on the priorities of the bands or groupings. In some aspects, the UE 120 may use a scaling factor or a set of scaling factors for scaling transmit powers of carriers of a band or grouping. Additionally, or alternatively, the UE 120 may drop one or more uplink transmissions on one or more uplink carriers based at least in part on priorities of the one or more uplink transmissions.

Additionally, or alternatively, the UE 120 may perform power scaling between bands according to the per frequency band limit and then perform power scaling within a band according to a per band limit. In this case, the UE 120 may determine whether a maximum power of each band or grouping is exceeded and, if so, scale transmit powers on carriers in a band or grouping; determine whether a transmit power of each uplink carrier exceeds a carrier transmit power and, if so, scale a transmit power on a carrier; and determine whether a total power across uplink carriers in a grouping or band exceeds a maximum transmit power of the grouping or band and, if so, scale uplink carriers in the grouping or band. In some aspects, the UE 120 may determine the maximum transmit power of each band or grouping based at least in part on a semi-static RRC configuration. Additionally, or alternatively, the UE 120 may determine the maximum transmit power dynamically, such as based at least in part on whether a reservation of resources has been made, which bands or groupings have uplink transmissions, or another factor. Although some aspects are described herein in terms of uplink carriers, transmit power control described herein may be applicable to a sidelink, a downlink, or another link.

Figure 7E:
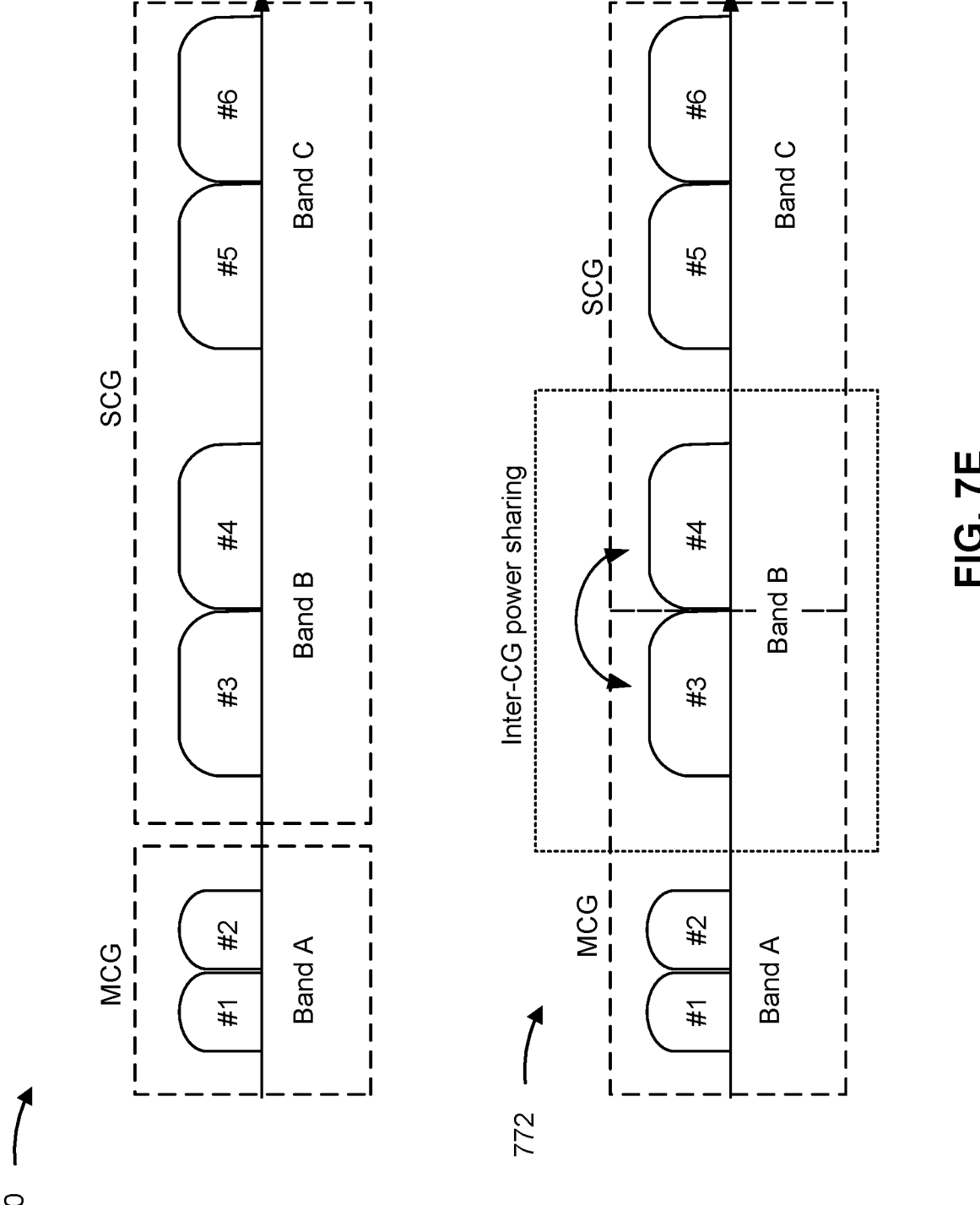

In some aspects, the UE 120 may perform power scaling for an ENDC or NRDC mode. For example, the UE 120 may be configured for independent power control on different cell groups, such as independent power control for a master cell group (MCG) and for a secondary cell group (SCG). In this case, the MCG may be a first grouping with a first maximum transmit power $P_{MCG}$ and the SCG may be a second grouping with a second maximum transmit power $P_{SCG}$, as shown in FIG. 7E and by reference number 770. The UE 120 may determine whether transmit powers of carriers 1 and 2 of band A in the MCG exceed $P_{MCG}$ and, if so, may scale one or more of the transmit powers to determine one or more scaled transmit powers such that a sum of all transmit powers on the MCG does not exceed $P_{MCG}$. Additionally, or alternatively, the UE 120 may determine whether transmit powers of carrier 3-6 on bands B and C exceed $P_{SCG}$ and, if so, may scale one or more of the transmit powers to determine one or more scaled transmit powers such that a sum of all transmit powers on the SCG does not exceed $S_{SCG}$. Similarly, as shown in FIG. 7E, and by reference number 772, the UE 120 may support inter cell group (inter-CG) power sharing. This may occur when a band or grouping includes carriers belonging to a plurality of CGs. In this case, for ENDC mode, the UE 120 may perform dynamic power sharing for MCG carriers and SCG carriers in the same band or grouping, such as carriers 3 and 4 in band B. Similarly, for NRDC mode, the UE 120 may perform semi-static power sharing between $P_{MCG}$ and $P_{SCG}$ on a per band basis or dynamic power sharing based at least in part on an MCG scheduling delay for carriers within the same band or group.

Figure 7F:
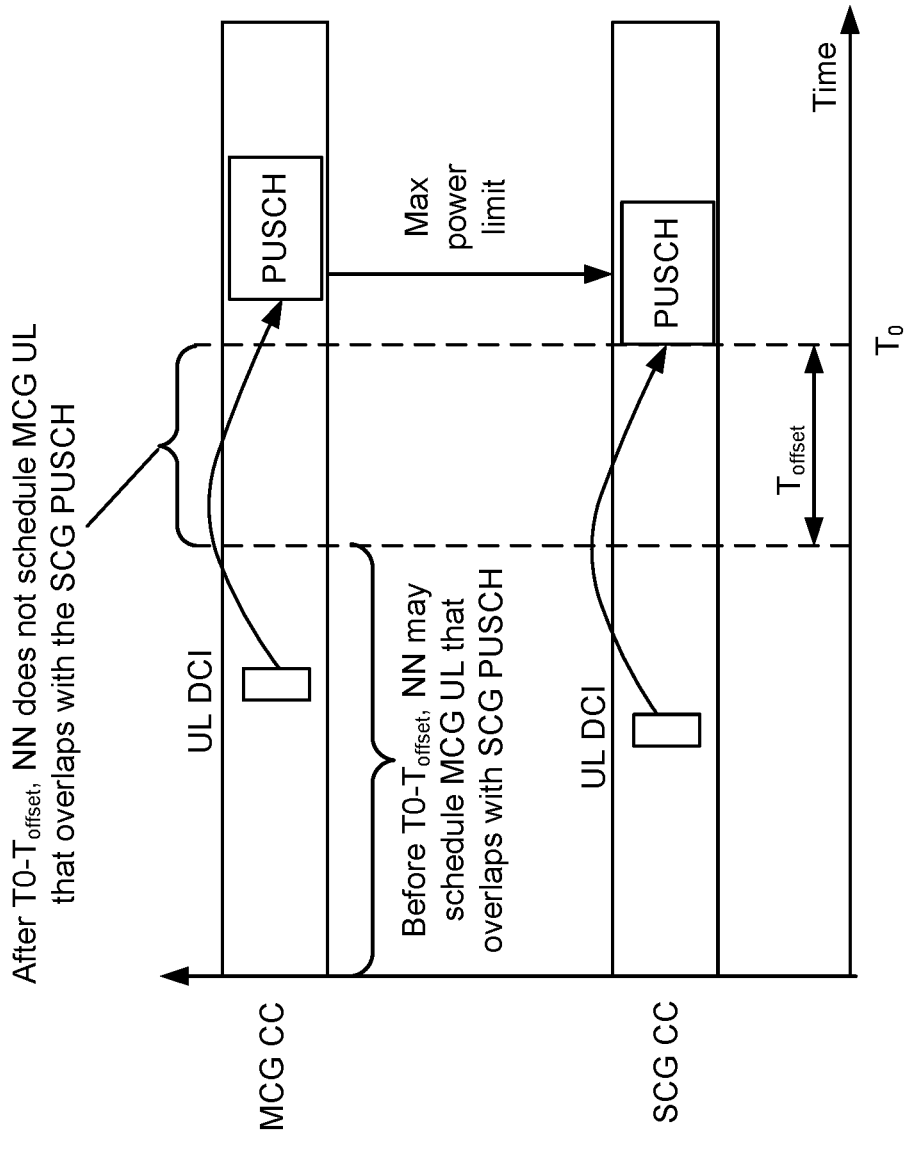

FIG. 7F shows an example 774 of dynamic power sharing. As shown, the UE 120 may split power between an MCG and an SCG based at least in part on a downlink control information (DCI) instruction. Here, for an MCG uplink transmission, the SCG transmission does not affect the MCG uplink power control. In contrast, for SCG uplink transmission, a maximum transmit power for the SCG is a lesser of $P_{SCG}$ and $P_{total}$-$P_{tot,MCG}$. In other words, the UE 120 may determine an MCG transmit power based at least in part on MCG DCIs until a $T_0$-$T_{offset}$ time. After the time $T_0$-$T_{offset}$, network node 110 may avoid scheduling MCG uplink transmissions that overlap with the SCG starting time $T_0$. In other words, the UE 120 performs one-way (MCG to SCG) power sharing for inter-CG power sharing. In some aspects, the UE 120 may use a prioritization rule, such as one or more prioritization rules described above, within each cell group. In some aspects, the UE 120 may report a value for $T_{offset}$ as a capability indication to enable the network node 110 to forgo scheduling MCG uplink transmissions overlapping with the SCG start time $T_0$. For example, the UE 120 may report, as a value for $T_{offset}$, a maximum possible value that is among a set of minimum UE processing times across all serving cells in the MCG and the SCG. Additionally, or alternatively, the UE 120 may report the maximum possible value from among the minimum UE processing times except for a channel state information (CSI) multiplexing minimum processing time $$T^{mux}_{proc,CSI}.$$

Returning to FIG. 7A, and as shown by reference number 740, the UE 120 may transmit using a scaled transmit power. For example, the UE 120 may transmit a first communication (on a first carrier) using the first scaled transmit power and a second communication (on a second carrier) using the second scaled transmit power. Additionally, or alternatively, the UE 120 may transmit the first communication using the first scaled transmit power and the second communication using the second transmit power. Additionally, or alternatively, the UE 120 may transmit the first communication using the first transmit power and the second communication using the second scaled transmit power. In other words, the UE 120 may use only scaled transmit powers or a combination of scaled transmit powers and unscaled transmit powers. Additionally, or alternatively, the UE 120 may drop transmission of one or more communications on one or more carriers (e.g., forgo transmission and use a resource assigned for transmission for another communication or allow the resource to be used by another wireless communication device).

As indicated above, FIGS. 7A-7F are provided as examples. Other examples may differ from what is described with respect to FIGS. 7A-7F.

Figure 8:
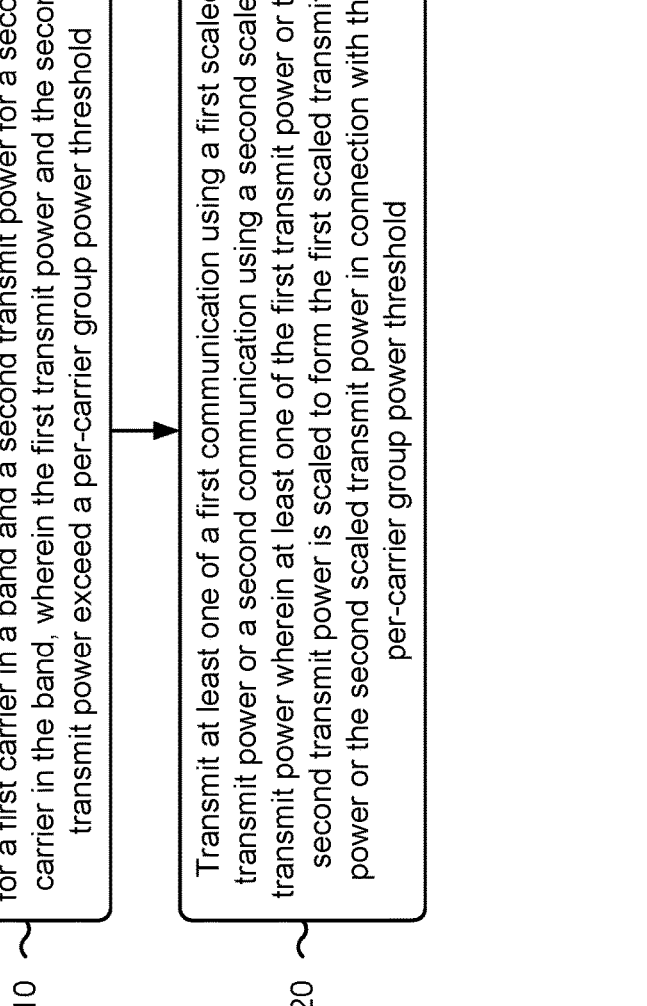
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with power control for carrier aggregation and dual connectivity operation.

As shown in FIG. 8, in some aspects, process 800 may include receiving information associated with identifying a first transmit power for a first carrier in a band and a second transmit power for a second carrier in the band, wherein the first transmit power and the second transmit power exceed a per-carrier group power threshold (block 810). For example, the UE (e.g., using communication manager 140 and/or reception component 1002, depicted in FIG. 10) may receive information associated with identifying a first transmit power for a first carrier in a band and a second transmit power for a second carrier in the band, wherein the first transmit power and the second transmit power exceed a per-carrier group power threshold, as described above.

As further shown in FIG. 8, in some aspects, process 800 may include transmitting at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold (block 820). For example, the UE (e.g., using communication manager 140 and/or transmission component 1004, depicted in FIG. 10) may transmit at least one of a first communication using a first scaled transmit power or a second communication using a second scaled transmit power, as described above. In some aspects, at least one of the first transmit power or the second transmit power is scaled to form the first scaled transmit power or the second scaled transmit power in connection with the per-carrier group power threshold.

Process 800 may include additional aspects, such as any single aspect or any combination of aspects described below and/or in connection with one or more other processes described elsewhere herein.

In a first aspect, the per-carrier group threshold is associated with at least one of a configured group of carriers, a configured frequency band, a configured group of frequency bands, a power amplifier, or a transmit chain.

In a second aspect, alone or in combination with the first aspect, process 800 includes scaling at least one of the first transmit power or the second transmit power to determine at least one of the first scaled transmit power or the second scaled transmit power.

In a third aspect, alone or in combination with one or more of the first and second aspects, scaling the at least one of the first transmit power or the second transmit power comprises scaling the at least one of the first transmit power or the second transmit power based at least in part on a priority order.

In a fourth aspect, alone or in combination with one or more of the first through third aspects, scaling the at least one of the first transmit power or the second transmit power comprises scaling the at least one of the first transmit power or the second transmit power based at least in part on a configured power offset.

In a fifth aspect, alone or in combination with one or more of the first through fourth aspects, scaling the at least one of the first transmit power or the second transmit power comprises scaling the at least one of the first transmit power or the second transmit power based at least in part on a per-frequency range power threshold.

In a sixth aspect, alone or in combination with one or more of the first through fifth aspects, scaling the at least one of the first transmit power or the second transmit power comprises scaling the at least one of the first transmit power or the second transmit power concurrently, based at least in part on the per-frequency range power threshold and the per-carrier group power threshold, sequentially based at least in part on the per-frequency range power threshold and then based at least in part on the per-carrier group power threshold, or sequentially based at least in part on the per-carrier group power threshold and then based at least in part on the per-frequency range power threshold.

In a seventh aspect, alone or in combination with one or more of the first through sixth aspects, a master cell group is associated with a first power control configuration and a secondary cell group is associated with a second power control configuration, and at least one of the first scaled transmit power or the second scaled transmit power is based at least in part on the first power control configuration or the second power control configuration.

In an eighth aspect, alone or in combination with one or more of the first through seventh aspects, the second power control configuration is based at least in part on the first power control configuration.

In a ninth aspect, alone or in combination with one or more of the first through eighth aspects, at least one of the first power control configuration or the second power control configuration is based at least in part on a timing criterion.

In a tenth aspect, alone or in combination with one or more of the first through ninth aspects, the first scaled transmit power or the second scaled transmit power is based at least in part on an inter-cell group power sharing threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., network node 110) performs operations associated with power control for carrier aggregation and dual connectivity operation.

As shown in FIG. 9, in some aspects, process 900 may include transmitting information associated with identifying a first transmit power for a first carrier in a band and a second transmit power for a second carrier in the band, wherein a sum of the first transmit power and the second transmit power exceed a per-carrier group power threshold (block 910). For example, the network node (e.g., using communication manager 150 and/or transmission component 1104, depicted in FIG. 11) may transmit information associated with identifying a first transmit power for a first carrier in a band and a second transmit power for a second carrier in the band, wherein a sum of the first transmit power and the second transmit power exceed a per-carrier group power threshold, as described above.

As further shown in FIG. 9, in some aspects, process 900 may include receiving at least one of a first communication using a first scaled transmit power or a second communication using a second scaled transmit power, wherein at least one of the first transmit power or the second transmit power is scaled to the first scaled transmit power or the second scaled transmit power, respectively, in connection with the per-carrier group power threshold (block 920). For example, the network node (e.g., using communication manager 150 and/or reception component 1102, depicted in FIG. 11) may receive at least one of a first communication using a first scaled transmit power or a second communication using a second scaled transmit power, as described above. In some aspects, at least one of the first transmit power or the second transmit power is scaled to the first scaled transmit power or the second scaled transmit power, respectively, in connection with the per-carrier group power threshold.

Process 900 may include additional aspects, such as any single aspect or any combination of aspects described below and/or in connection with one or more other processes described elsewhere herein.

In a first aspect, the per-carrier group threshold is associated with at least one of a configured group of carriers, a configured frequency band, a configured group of frequency bands, a power amplifier, or a transmit chain.

In a second aspect, alone or in combination with the first aspect, at least one of the first transmit power or the second transmit power is scaled to at least one of the first scaled transmit power or the second scaled transmit power, respectively.

In a third aspect, alone or in combination with one or more of the first and second aspects, the at least one of the first transmit power or the second transmit power is scaled based at least in part on a priority order.

In a fourth aspect, alone or in combination with one or more of the first through third aspects, the at least one of the first transmit power or the second transmit power is scaled based at least in part on a configured power offset.

In a fifth aspect, alone or in combination with one or more of the first through fourth aspects, the at least one of the first transmit power or the second transmit power is scaled based at least in part on a per-frequency range power threshold.

In a sixth aspect, alone or in combination with one or more of the first through fifth aspects, the at least one of the first transmit power or the second transmit power is scaled concurrently, based at least in part on the per-frequency range power threshold and the per-carrier group power threshold, sequentially based at least in part on the per-frequency range power threshold and then based at least in part on the per-carrier group power threshold, or sequentially based at least in part on the per-carrier group power threshold and then based at least in part on the per-frequency range power threshold.

In a seventh aspect, alone or in combination with one or more of the first through sixth aspects, a master cell group is associated with a first power control configuration and a secondary cell group is associated with a second power control configuration, and at least one of the first scaled transmit power or the second scaled transmit power is based at least in part on the first power control configuration or the second power control configuration.

In an eighth aspect, alone or in combination with one or more of the first through seventh aspects, the second power control configuration is based at least in part on the first power control configuration.

In a ninth aspect, alone or in combination with one or more of the first through eighth aspects, at least one of the first power control configuration or the second power control configuration is based at least in part on a timing criterion.

In a tenth aspect, alone or in combination with one or more of the first through ninth aspects, the first scaled transmit power or the second scaled transmit power is based at least in part on an inter-cell group power sharing threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
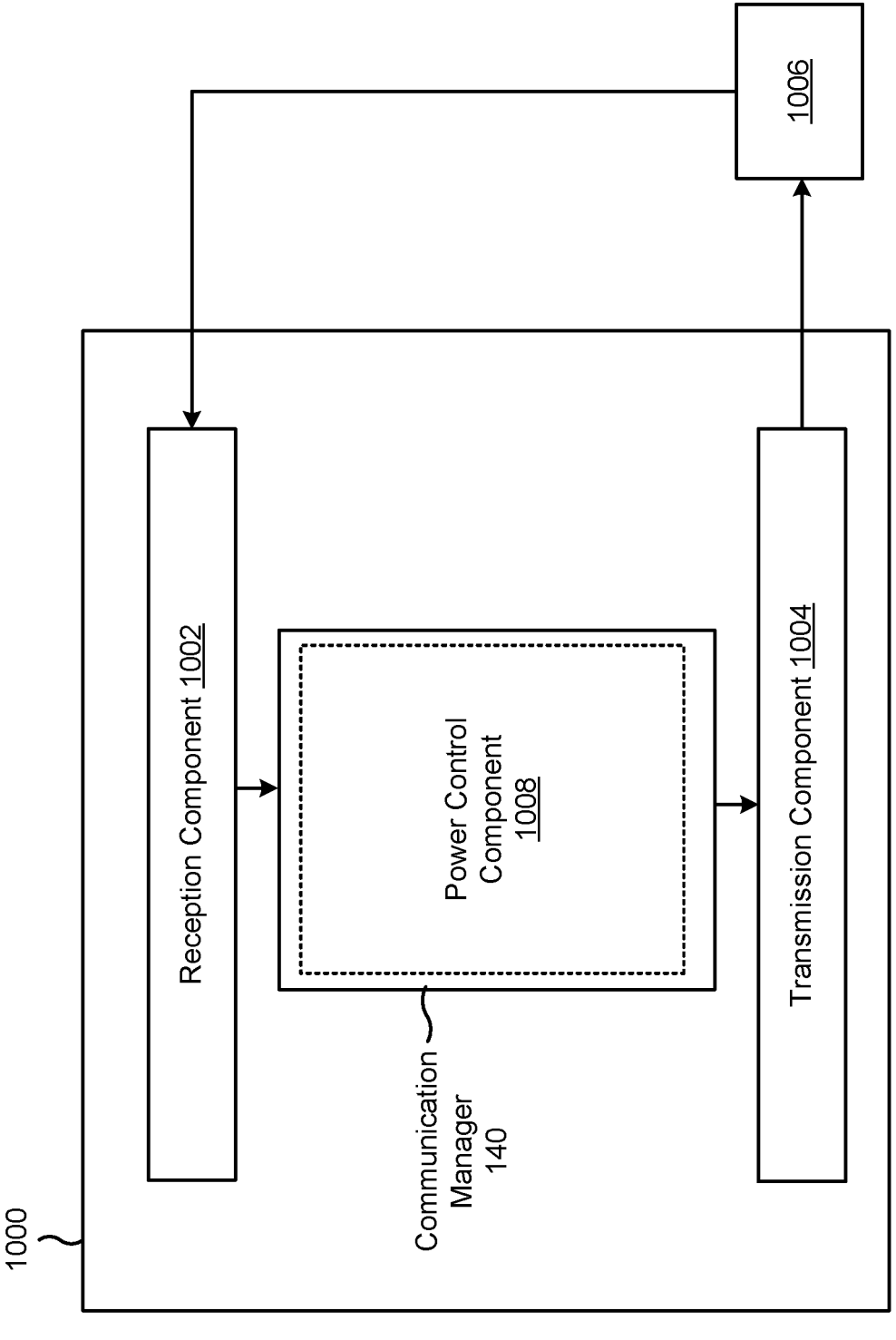
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus

1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a power control component 1008, among other examples.

In some aspects, the apparatus 1000 may be configured to perform one or more operations described herein in connection with FIGS. 7A-7F. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive information associated with identifying a first transmit power for a first carrier in a band and a second transmit power for a second carrier in the band, wherein the first transmit power and the second transmit power exceed a per-carrier group power threshold. The transmission component 1004 may transmit at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold. The power control component 1008 may scale at least one of the first transmit power or the second transmit power to determine at least one of the first scaled transmit power or the second scaled transmit power.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
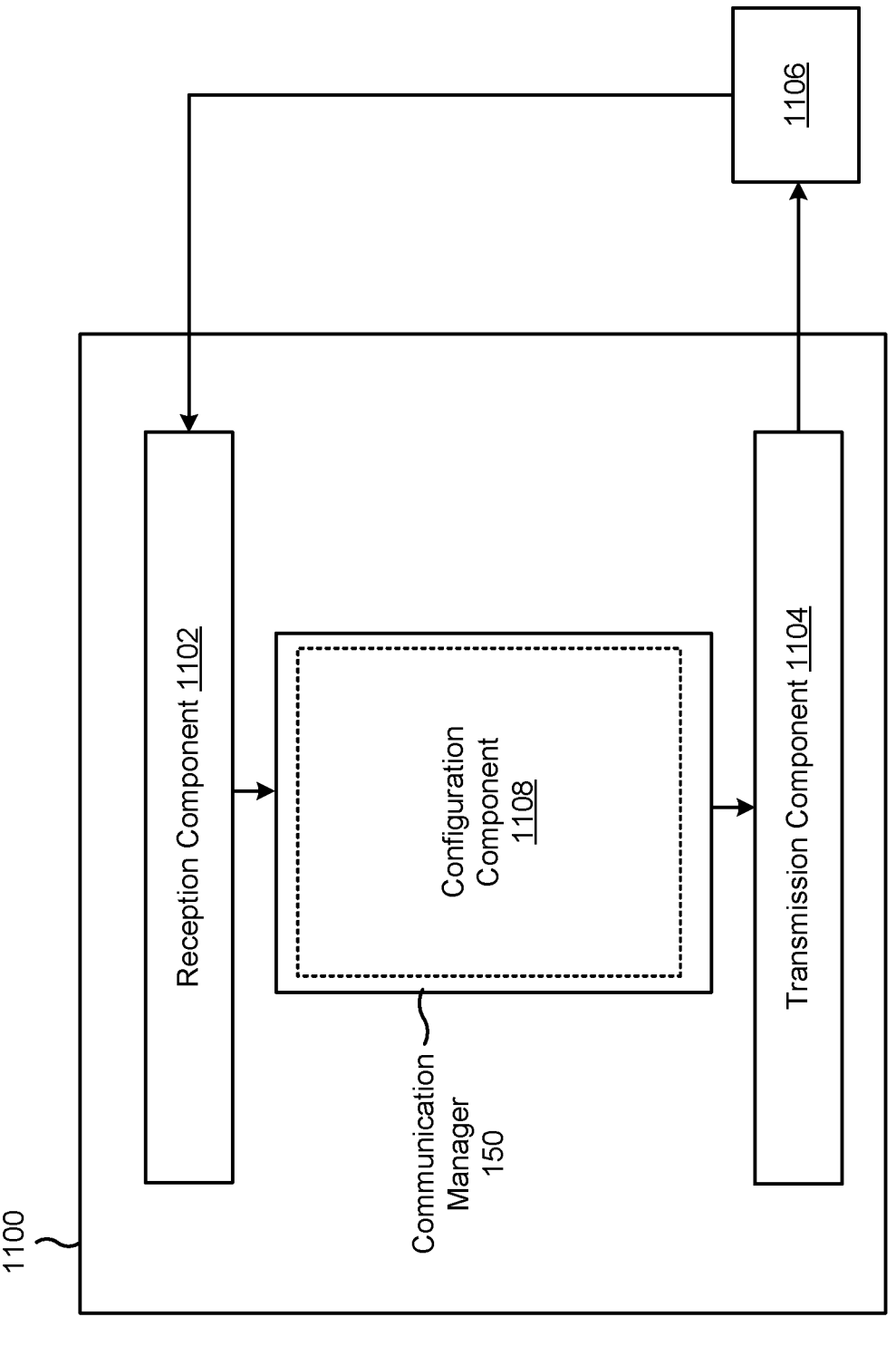

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150) may include a configuration component 1108, among other examples.

In some aspects, the apparatus 1100 may be configured to perform one or more operations described herein in connection with FIGS. 7A-7F. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit information associated with identifying a first transmit power for a first carrier in a band and a second transmit power for a second carrier in the band, wherein a sum of the first transmit power and the second transmit power exceed a per-carrier group power threshold. The reception component 1102 may receive at least one of a first communication using a first scaled transmit power or a second communication using a second scaled transmit power, wherein at least one of the first transmit power or the second transmit power is scaled to the first scaled transmit power or the second scaled transmit power, respectively, in connection with the per-carrier group power threshold. The configuration component 1108 may configure one or more power control parameters or thresholds for use in transmit power determination.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving information associated with identifying a first transmit power for a first carrier in a band and a second transmit power for a second carrier in the band, wherein the first transmit power and the second transmit power exceed a per-carrier group power threshold; and transmitting at least one of a first communication using a first scaled transmit power or a second communication using a second scaled transmit power, wherein at least one of the first transmit power or the second transmit power is scaled to form the first scaled transmit power or the second scaled transmit power in connection with the per-carrier group power threshold.

Aspect 2: The method of Aspect 1, wherein the per-carrier group threshold is associated with at least one of: a configured group of carriers, a configured frequency band, a configured group of frequency bands, a power amplifier, or a transmit chain, a configured group of carriers, a configured frequency band, a configured group of frequency bands, a power amplifier, or a transmit chain.

Aspect 3: The method of any of Aspects 1-2, further comprising: scaling at least one of the first transmit power or the second transmit power to determine at least one of the first scaled transmit power or the second scaled transmit power.

Aspect 4: The method of Aspect 3, wherein scaling the at least one of the first transmit power or the second transmit power comprises: scaling the at least one of the first transmit power or the second transmit power based at least in part on a priority order, scaling the at least one of the first transmit power or the second transmit power based at least in part on a priority order.

Aspect 5: The method of any of Aspects 3-4, wherein scaling the at least one of the first transmit power or the second transmit power comprises: scaling the at least one of the first transmit power or the second transmit power based at least in part on a configured power offset, scaling the at least one of the first transmit power or the second transmit power based at least in part on a configured power offset.

Aspect 6: The method of any of Aspects 3-5, wherein scaling the at least one of the first transmit power or the second transmit power comprises: scaling the at least one of the first transmit power or the second transmit power based at least in part on a per-frequency range power threshold, scaling the at least one of the first transmit power or the second transmit power based at least in part on a per-frequency range power threshold.

Aspect 7: The method of Aspect 6, wherein scaling the at least one of the first transmit power or the second transmit power comprises: scaling the at least one of the first transmit power or the second transmit power: concurrently, based at least in part on the per-frequency range power threshold and the per-carrier group power threshold, sequentially based at least in part on the per-frequency range power threshold and then based at least in part on the per-carrier group power threshold, or sequentially based at least in part on the per-carrier group power threshold and then based at least in part on the per-frequency range power threshold.

Aspect 8: The method of any of Aspects 1-7, wherein a master cell group is associated with a first power control configuration and a secondary cell group is associated with a second power control configuration, and wherein at least one of the first scaled transmit power or the second scaled transmit power is based at least in part on the first power control configuration or the second power control configuration, wherein at least one of the first scaled transmit power or the second scaled transmit power is based at least in part on the first power control configuration or the second power control configuration.

Aspect 9: The method of Aspect 8, wherein the second power control configuration is based at least in part on the first power control configuration.

Aspect 10: The method of any of Aspects 8-9, wherein at least one of the first power control configuration or the second power control configuration is based at least in part on a timing criterion.

Aspect 11: The method of any of Aspects 1-10, wherein the first scaled transmit power or the second scaled transmit power is based at least in part on an inter-cell group power sharing threshold.

Aspect 12: A method of wireless communication performed by a network node, comprising: transmitting information associated with identifying a first transmit power for a first carrier in a band and a second transmit power for a second carrier in the band, wherein a sum of the first transmit power and the second transmit power exceed a per-carrier group power threshold; and receiving at least one of a first communication using a first scaled transmit power or a second communication using a second scaled transmit power, wherein at least one of the first transmit power or the second transmit power is scaled to the first scaled transmit power or the second scaled transmit power, respectively, in connection with the per-carrier group power threshold.

Aspect 13: The method of Aspect 12, wherein the per-carrier group threshold is associated with at least one of: a configured group of carriers, a configured frequency band, a configured group of frequency bands, a power amplifier, or a transmit chain. a configured group of carriers, a configured frequency band, a configured group of frequency bands, a power amplifier, or a transmit chain.

Aspect 14: The method of any of Aspects 12-13, wherein at least one of the first transmit power or the second transmit power is scaled to at least one of the first scaled transmit power or the second scaled transmit power, respectively.

Aspect 15: The method of Aspect 14, wherein the at least one of the first transmit power or the second transmit power is scaled based at least in part on a priority order.

Aspect 16: The method of any of Aspects 14-15, wherein the at least one of the first transmit power or the second transmit power is scaled based at least in part on a configured power offset.

Aspect 17: The method of any of Aspects 14-16, wherein the at least one of the first transmit power or the second transmit power is scaled based at least in part on a per-frequency range power threshold.

Aspect 18: The method of Aspect 17, wherein the at least one of the first transmit power or the second transmit power is scaled: concurrently, based at least in part on the per-frequency range power threshold and the per-carrier group power threshold, sequentially based at least in part on the per-frequency range power threshold and then based at least in part on the per-carrier group power threshold, or sequentially based at least in part on the per-carrier group power threshold and then based at least in part on the per-frequency range power threshold.

Aspect 19: The method of any of Aspects 12-18, wherein a master cell group is associated with a first power control configuration and a secondary cell group is associated with a second power control configuration, and wherein at least one of the first scaled transmit power or the second scaled transmit power is based at least in part on the first power control configuration or the second power control configuration. wherein at least one of the first scaled transmit power or the second scaled transmit power is based at least in part on the first power control configuration or the second power control configuration.

Aspect 20: The method of Aspect 19, wherein the second power control configuration is based at least in part on the first power control configuration.

Aspect 21: The method of any of Aspects 19-20, wherein at least one of the first power control configuration or the second power control configuration is based at least in part on a timing criterion.

Aspect 22: The method of any of Aspects 12-21, wherein the first scaled transmit power or the second scaled transmit power is based at least in part on an inter-cell group power sharing threshold.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
memory; and
one or more processors, coupled to the memory, configured to:
receive information associated with identifying a first transmit power for a first carrier in a band and a second transmit power for a second carrier in the band, wherein the first transmit power and the second transmit power exceed a per-carrier group power threshold;
scale at least one of the first transmit power or the second transmit power:
concurrently, based at least in part on a per-frequency range power threshold and the per-carrier group power threshold,
sequentially, based at least in part on the per-frequency range power threshold and then based at least in part on the per-carrier group power threshold, or
sequentially, base at least in part on the per-carrier group power threshold and then based at least in part on the per-frequency range power threshold; and
transmit at least one of a first communication using the first scaled transmit power or a second communication using the second scaled transmit power.

2. The UE of claim 1, wherein the per-carrier group threshold is associated with at least one of:
  a configured group of carriers,
  a configured frequency band,
  a configured group of frequency bands,
  a power amplifier, or
  a transmit chain.

3. The UE of claim 1, wherein the one or more processors, to further scale the at least one of the first transmit power or the second transmit power, are configured to:
  scale the at least one of the first transmit power or the second transmit power based at least in part on a priority order.

4. The UE of claim 1, wherein the one or more processors, to further scale the at least one of the first transmit power or the second transmit power, are configured to:
  scale the at least one of the first transmit power or the second transmit power based at least in part on a configured power offset.

5. The UE of claim 1, wherein a master cell group is associated with a first power control configuration and a secondary cell group is associated with a second power control configuration, and
  wherein at least one of the first scaled transmit power or the second scaled transmit power is based at least in part on the first power control configuration or the second power control configuration.

6. The UE of claim 5, wherein the second power control configuration is based at least in part on the first power control configuration.

7. The UE of claim 5, wherein at least one of the first power control configuration or the second power control configuration is based at least in part on a timing criterion.

8. The UE of claim 1, wherein the first scaled transmit power or the second scaled transmit power is based at least in part on an inter-cell group power sharing threshold.

9. A network node for wireless communication, comprising:
  a memory; and
  one or more processors, coupled to the memory, configured to:
    transmit information associated with identifying a first transmit power for a first carrier in a band and a second transmit power for a second carrier in the band, wherein a sum of the first transmit power and the second transmit power exceed a per-carrier group power threshold; and
    receive at least one of a first communication using a first scaled transmit power or a second communication using a second scaled transmit power,
    wherein the at least one of the first transmit power or the second transmit power is scaled:
      concurrently, based at least in part on a per-frequency range power threshold and the per-carrier group power threshold,
      sequentially, based at least in part on the per-frequency range power threshold and then based at least in part on the per-carrier group power threshold, or
      sequentially, based at least in part on the per-carrier group power threshold and then based at least in part on the per-frequency range power threshold.

10. The network node of claim 9, wherein the per-carrier group threshold is associated with at least one of:
  a configured group of carriers,
  a configured frequency band,
  a configured group of frequency bands,
  a power amplifier, or
  a transmit chain.

11. The network node of claim 9, wherein the at least one of the first transmit power or the second transmit power is further scaled based at least in part on a priority order.

12. The network node of claim 9, wherein the at least one of the first transmit power or the second transmit power is further scaled based at least in part on a configured power offset.

13. The network node of claim 9, wherein a master cell group is associated with a first power control configuration and a secondary cell group is associated with a second power control configuration, and
  wherein at least one of the first scaled transmit power or the second scaled transmit power is based at least in part on the first power control configuration or the second power control configuration.

14. The network node of claim 13, wherein the second power control configuration is based at least in part on the first power control configuration.

15. The network node of claim 13, wherein at least one of the first power control configuration or the second power control configuration is based at least in part on a timing criterion.

16. The network node of claim 9, wherein the first scaled transmit power or the second scaled transmit power is based at least in part on an inter-cell group power sharing threshold.

17. A method of wireless communication performed by an apparatus of a user equipment (UE), comprising:
  receiving information associated with identifying a first transmit power for a first carrier in a band and a second transmit power for a second carrier in the band, wherein the first transmit power and the second transmit power exceed a per-carrier group power threshold;
  scaling at least one of the first transmit power or the second transmit power:
    concurrently, based at least in part on a per-frequency range power threshold and the per-carrier group power threshold,
    sequentially, based at least in part on the per-frequency range power threshold and then based at least in part on the per-carrier group power threshold, or
    sequentially, base at least in part on the per-carrier group power threshold and then based at least in part on the per-frequency range power threshold; and
  transmitting at least one of a first communication using the first scaled transmit power or a second communication using the second scaled transmit power.

18. The method of claim 17, wherein the per-carrier group threshold is associated with at least one of:
  a configured group of carriers,
  a configured frequency band,
  a configured group of frequency bands,
  a power amplifier, or
  a transmit chain.

19. The method of claim 17, wherein scaling the at least one of the first transmit power or the second transmit power further comprises:
  scaling the at least one of the first transmit power or the second transmit power based at least in part on a priority order.

20. The method of claim 17, wherein scaling the at least one of the first transmit power or the second transmit power further comprises:
  scaling the at least one of the first transmit power or the second transmit power based at least in part on a configured power offset.

21. A method of wireless communication performed by an apparatus of a network node, comprising:

transmitting information associated with identifying a first transmit power for a first carrier in a band and a second transmit power for a second carrier in the band, wherein a sum of the first transmit power and the second transmit power exceed a per-carrier group power threshold; and receiving at least one of a first communication using a first scaled transmit power or a second communication using a second scaled transmit power, wherein the at least one of the first transmit power or the second transmit power is scaled:

concurrently, based at least in part on a per-frequency range power threshold and the per-carrier group power threshold, sequentially, based at least in part on the per-frequency range power threshold and then based at least in part on the per-carrier group power threshold, or sequentially, based at least in part on the per-carrier group power threshold and then based at least in part on the per-frequency range power threshold.

22. The method of claim 21, wherein the per-carrier group threshold is associated with at least one of:

a configured group of carriers, a configured frequency band, a configured group of frequency bands, a power amplifier, or a transmit chain.

\* \* \* \* \*